United States Patent
Sommer et al.

[11] 3,994,873
[45] Nov. 30, 1976

[54] AZO DYESTUFFS CONTAINING SULFONYLAMINO-SULFONYL GROUPS

[75] Inventors: Richard Sommer; Herbert Hugl, both of Leverkusen; Gerhard Wolfrum, Bergisch-Neukirchen; Karl-Heinz Schündehütte, Opladen; Kersten Trautner, Cologne, all of Germany

[73] Assignee: Bayer Aktiengesellschaft, Leverkusen, Germany

[22] Filed: May 8, 1975

[21] Appl. No.: 575,699

[30] Foreign Application Priority Data
May 9, 1974 Germany............... 2422465

[52] U.S. Cl. ................ 260/206; 260/152; 260/156; 260/163; 260/207; 260/556 AR; 260/556 SN; 260/558 P; 260/578
[51] Int. Cl.² ............. C09B 29/12; D06P 3/24
[58] Field of Search.............. 260/206, 207, 207.1

[56] References Cited
UNITED STATES PATENTS

| | | | |
|---|---|---|---|
| 2,909,516 | 10/1959 | Jung.................... | 260/196 |
| 3,585,183 | 6/1971 | Horning................ | 260/203 |
| 3,883,503 | 5/1975 | Assche et al.......... | 260/206 |

FOREIGN PATENTS OR APPLICATIONS

| | | | |
|---|---|---|---|
| 2,224,116 | 11/1972 | Germany............ | 260/206 |

*Primary Examiner*—Floyd D. Higel
*Assistant Examiner*—John J. Doll
*Attorney, Agent, or Firm*—Plumley and Tyner

[57] ABSTRACT

Dyestuffs of the formula

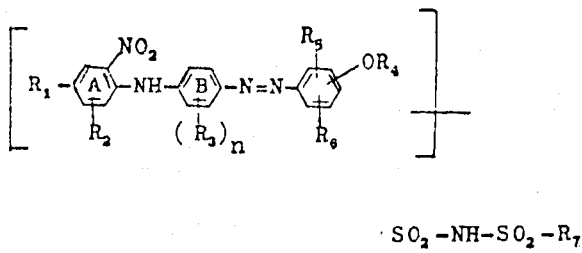

wherein
$R_1$ denotes H, $NO_2$, CN,

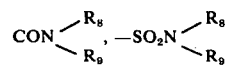

or $COOR_{10}$,
$R_2$ denotes H, alkyl, alkoxy, aryl, halogen or $NO_2$,
$R_3$ denotes H, halogen, alkyl, alkoxy, aryl or

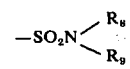

$R_4$ denotes H, alkyl or $-SO_2-$aryl,
$R_5$ denotes H, halogen, alkyl, aryl or alkoxy,
$R_6$ denotes H or alkyl,
$R_7$ denotes alkyl, aryl or dialkylamino and
$R_8$ and $R_9$ denote H, alkyl, aryl, aralkyl or hetaryl or can, together with the N atom, form the radical of a heterocyclic structure,
$R_{10}$ denotes alkyl and
$n$ denotes 1 or 2,
the $OR_4$ radical is in the ortho-position or paraposition relative to the azo group and
the $-SO_2-NH-SO_2-R_7-$ radical is present in place of $R_1$ in the ring A or in place of $R_3$ in the ring $B_1$
are suitable for dyeing and printing natural and synthetic fibrous materials containing amide groups.

4 Claims, No Drawings

AZO DYESTUFFS CONTAINING SULFONYLAMINO-SULFONYL GROUPS

The invention to azo dyestuffs which in the form of the free acid correspond to the formula

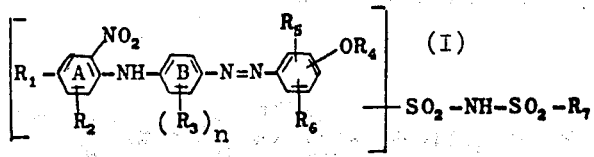

wherein
$R_1$ denotes H, $NO_2$, CN,

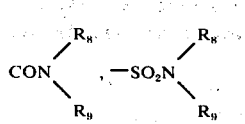

or $COOR_{10}$, $R_2$ denotes H, alkyl, alkoxy, aryl, halogen or $NO_2$,
$R_3$ denotes H, halogen, alkyl, alkoxy, aryl or

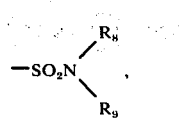

$R_4$ denotes H, alkyl or $-SO_2$-aryl,
$R_5$ denotes H, halogen, alkyl, aryl or alkoxy,
$R_6$ denotes H or alkyl,
$R_7$ denotes alkyl, aryl or dialkylamino and
$R_8$ and $R_9$ denote H, alkyl, aryl, aralkyl or hetaryl or can, together with the N atom, form the radical of a heterocyclic structure,
$R_{10}$ denotes alkyl and
$n$ denotes 1 or 2,
the $OR_4$ radical is in the ortho-position or paraposition relative to the azo group and
the $-SO_2-NH-SO_2-R_7-$ radical is present in place of $R_1$ in the ring A or in place of $R_3$ in the ring B.

Suitable alkyl radicals $R_2$, $R_3$, $R_5$, $R_6$, $R_8$, $R_9$ and $R_{10}$ are, in particular, those with 1–4 C atoms, which can optionally be substituted further by hydroxyl, cyano, halogen, such as chlorine, bromine or fluorine, or $C_1$–$C_4$-alkoxy, for example methyl, ethyl, n-propyl, iso-propyl, n-butyl, tert.-butyl, cyanoethyl, hydroxyethyl, 2-hydroxypropyl or 2-chloroethyl.

Suitable alkyl radicals $R_4$ are, in particular, those with 1–5 C atoms, which can be substituted by hydroxyl, phenyl, $C_1$–$C_4$-alkoxy, $C_1$–$C_4$-alkylcarbonyloxy or $C_2$–$C_4$-alkenylcarbonyloxy, in particular methyl, ethyl, propyl, butyl, hydroxyethyl and radicals of the formula

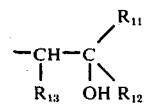

wherein
$R_{11}$ and $R_{13}$ represent hydrogen, methyl, ethyl, phenyl, hydroxymethyl, $C_1$–$C_4$-alkoxymethyl, benzyloxymethyl,
$C_1$–$C_4$-alkylcarbonyloxymethyl or $C_2$–$C_4$-alkenylcarbonyloxymethyl or chloromethyl, but either $R_{11}$ or $R_{13}$ must be hydrogen, and
$R_{12}$ represents hydrogen or $C_1$–$C_4$-alkyl, preferably hydrogen or methyl.

Suitable alkyl radicals $R_7$ are, in particular, unsubstituted alkyl radicals with 1–4 C atoms, such as methyl, ethyl, propyl and butyl.

Suitable aryl radicals $R_2$, $R_3$, $R_5$, $R_8$ and $R_9$ are, in particular, phenyl radicals which can contain further substituents, for example halogen such as chlorine, bromine and fluorine, $C_1$–$C_4$-alkyl and $C_1$–$C_4$-alkoxy.

Suitable aryl radicals $R_7$ or aryl radicals in the $-SO_2-$aryl group $R_4$ are, in particular, phenyl and naphthyl radicals, which can optionally be substituted by $C_1$–$C_4$-alkyl, $C_1$–$C_4$-alkoxy, halogen, such as chlorine, bromine or fluorine, cyano or nitro, but especially phenyl, o-, m- and p-methylphenyl, 1-naphthyl and 2-naphthyl.

Suitable alkoxy radicals $R_2$, $R_3$ and $R_5$ are, in particular, $C_1$–$C_4$-alkoxy, such as methoxy, ethoxy and butoxy.

Suitable halogen atoms $R_2$, $R_3$ and $R_5$ are chlorine, bromine and fluorine, but preferably chlorine.

Suitable aralkyl radicals $R_8$ and $R_9$ are, for example, benzyl or phenethyl radicals which are optionally substituted further by non-ionic substituents, but especially benzyl or 2-phenethyl.

A suitable heterocyclic radical $R_8$ is, for example, the 3-sulpholanyl radical.

Suitable heterocyclic structures which include the N atom of sulphonamide group or carboxylic acid amide group are

Examples of suitable dialkylamino groups $R_7$ are diethylamino, dimethylamino or dibutylamino groups.

Preferred dyestuffs are those which in the form of the free acid correspond to the formula

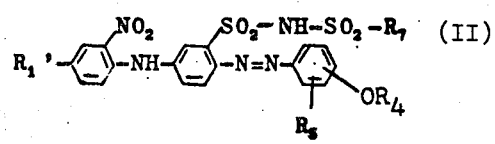

wherein
$R_1'$ represents H, nitro or the

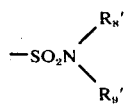

radical,

R$_8$' and R$_9$' represent H, C$_1$–C$_4$-alkyl, phenyl or benzyl or together with the N atom represent morpholinyl, piperidinyl or pyrrolidinyl, R$_4$, R$_5$ and R$_7$ have the abovementioned meaning and the OR$_4$ radical is in the o-position or p-position relative to the azo group, particularly those which in the form of the free acid correspond to the formula

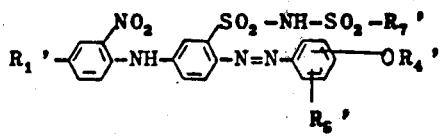

(III)

wherein

R$_1$' has the abovementioned meaning,

R$_4$' represents H, methyl, ethyl, propyl, butyl, 2-hydroxyethyl, 2-hydroxypropyl, 2-hydroxybutyl, 1-methyl-2-hydroxypropyl, 2-hydroxy-2-phenylethyl or 2,3-dihydroxypropyl and the —OR$_4$' radical is in the o- or p-position relative to the azo group, R$_5$' represents H, C$_1$–C$_4$-alkyl or phenyl and R$_7$' represents C$_1$–C$_4$-alkyl, phenyl, o- and p-tolyl or 1- or 2-naphthyl.

Further particularly preferred dyestuffs are those which in the form of the free acid correspond to the formula

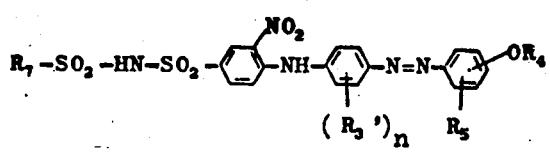

(IV)

wherein

R$_3$' represents H, halogen, C$_1$–C$_4$-alkyl, C$_1$–C$_4$-alkoxy or the

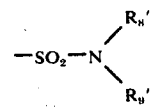

radical and

R$_4$, R$_5$, R$_7$, R$_8$', R$_9$' and n have the abovementioned meaning and the —OR$_4$ group is in the o-position or p-position relative to the azo bridge, especially those of the formula

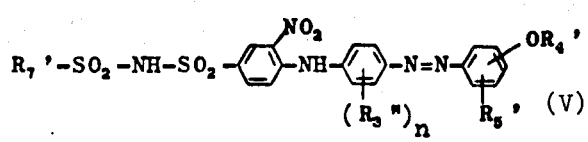

(V)

wherein

R$_3$'' represents H, methyl, ethyl, methoxy or ethoxy,

R$_4$', R$_5$', R$_7$' and *n* have the abovementioned meaning and the —OR$_4$' radical is in the o-position or p-position relative to the azo group.

Very particularly preferred dyestuffs are those which in the form of the free acid correspond to the formula

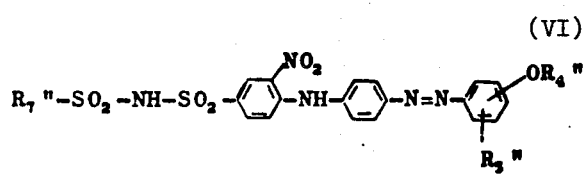

(VI)

wherein

R$_4$'' represents H, methyl, ethyl, propyl, 2-hydroxyethyl, 2-hydroxypropyl or 2-hydroxybutyl, R$_5$'' represents H, methyl, ethyl, tert.-butyl or phenyl and R$_7$'' represents methyl, ethyl, propyl, butyl, phenyl or o- or p-tolyl and the —OR$_4$'' radical is in the o-position or p-position relative to the azo bridge.

The dyestuffs can be prepared in accordance with various processes. One process for the preparation of the dyestuffs of the formula I consists of diazotising an amine of the formula VII, coupling it with a phenolic component of the formula VIII to form a dyestuff of the formula IX and optionally subsequently alkylating this with an alkyl halide, dialkyl sulphate, arylsulphonic acid alkyl ester, alkylene oxide or epichlorohydrin or subsequently acylating it with an arylsulphohalide, preferably an arylsulphochloride.

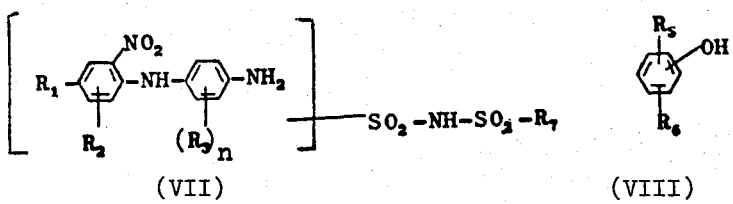

(VII)    (VIII)

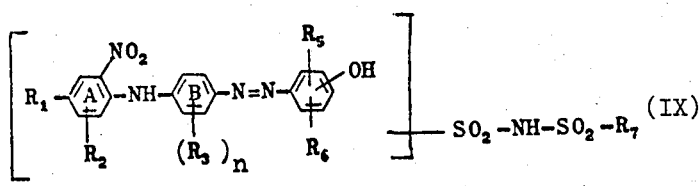

In the formulae (VII), (VIII) and (IX)
 $R_1$, $R_2$, $R_3$, $R_5$, $R_6$, $R_7$ and $n$ have the abovementioned meaning and
 the —$SO_2$—NH—$SO_2$—$R_7$ radical is either present in place of $R_1$ in the ring A or in place of $R_3$ in the ring B.

A further process for the preparation of the dyestuffs of the formula (I) is to condense an aminoazo dyestuff of the formula (XI) with an o-nitro-halogenobenzene of the formula (X)

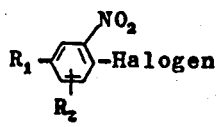

(X)

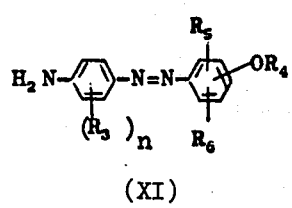

(XI)

wherein
 $R_1$ to $R_7$ and $n$ have the abovementioned meaning and the —$SO_2$—NH—$SO_2$—$R_7$ radical is present in place of
 $R_1$ in the ring A or in place of $R_3$ in the ring B.

Compounds of the general formula (VII) having the specific structure (XII)

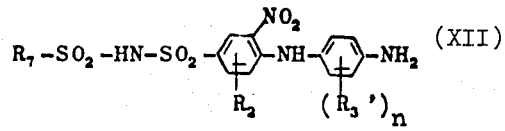

wherein
 $R_2$, $R_3'$, $R_7$ and $n$ have the abovementioned meaning can be prepared by condensation of

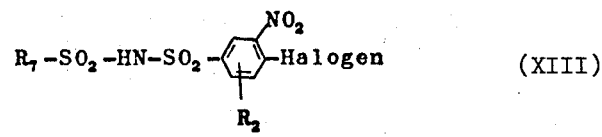

with

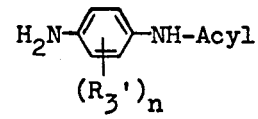

or with

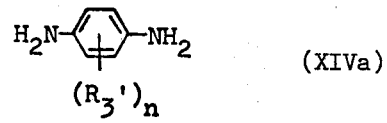

followed, in the case of XIV, by saponification of the acyl radical.

Compounds of the formula (XIII) are obtained in accordance with processes known in principle, by reaction of compounds of the formula (XV) with sulphonic acid halides of the formula $R_7$—$SO_2$—halogen.

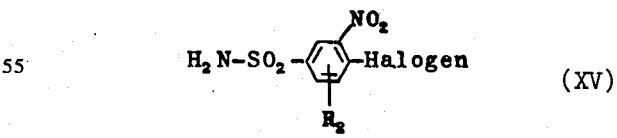

The compounds of the formula (XII) can also be obtained by condensation of o-nitrohalogenosulphonamides of the formula (XV) with acyldiamines of the formula (XIV), subsequent reaction of the compound (XVI), thus obtained, with sulphonic acid halides of the formula $R_7$—$SO_2$—halogen, and, thereafter, saponification of the acyl group.

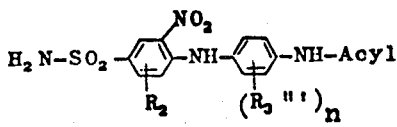

(XVI)

In the formulae (XV) and (XVI)

$R_2$ and $n$ have the abovementioned meaning and $R_3'''$ represents H, halogen, $C_1$–$C_4$-alkyl, $C_1$–$C_4$-alkoxy, aryl or

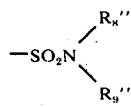

wherein $R_8''$ and $R_9''$ represent alkyl, aryl, aralkyl or radicals of a heterocyclic structure or can, together with the N atom, form the radical of a heterocyclic structure.

Compounds of the formula (VII) having the specific structure (XVII)

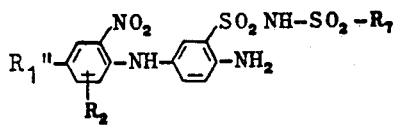

(XVII)

wherein $R_1''$ represents hydrogen, nitro, $COOR_{10}$,

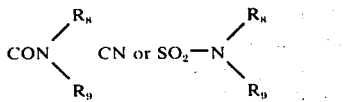

and $R_8$, $R_9$ and $R_{10}$ have the meaning mentioned, are obtained by condensing halogenonitrobenzenes of the formula (X) with compounds of the formula (XVIII)

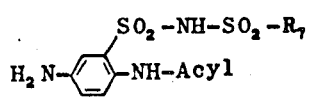

(XVIII)

and subsequently splitting off the acyl group by saponification.

Examples of suitable diazo components of the formula (VII) are: N-[4-(4-amino-phenylamino)-3-nitrobenzenesulphonyl]-benzenesulphonamide, -p-toluenesulphonamide, -o-toluenesulphonamide, -butanesulphonamide, -methanesulphonamide, -2'-naphthylsulphonamide, -1'-naphthylsulphonamide and -p-chlorobenzenesulphonamide, N-[4-(4-aminophenylamino)-3,5-dinitrobenzenesulphonyl]-benzenesulphonamide, -p-toluenesulphonamide, -o-chlorobenzenesulphonamide and -methanesulphonamide, N-[4-(4-amino-3-methoxy-phenylamino)-3-nitro-benzenesulphonyl]-benzenesulphonamide, -o-toluenesulphonamide and -1'-naphthylsulphonamide, N-[4-(4-amino-2,5-dichlorophenylamino)-3-nitrobenzesulphonyl]-benzenesulphonamide and -methanesulphonamide, N-[4-(4-amino-3-ethoxyphenylamino)-3-nitro-benzenesulphonyl]-p-toluenesulphonamide, -butanesulphonamide and -dimethylaminosulphonamide, N-[4-(4-amino-2-methoxy-phenylamino)-3-nitrobenzenesulphonyl]-methanesulphonamide, -o-toluenesulphonamide and -2'-naphthylsulphonamide, N-[4-(4-amino-2-methyl-phenylamino)-3-nitro-benzenesulphonyl]-benzenesulphonamide and -dibutylaminosulphonamide, N-[4-(4-amino-3-ethyl-phenylamino)-3-nitro-benzenesulphonyl]-p-toluenesulphonamide and p-chlorobenzenesulphonamide, N-[4-(4-amino-3-sulphamoylphenylamino)-3-nitro-benzenesulphonyl]-benzenesulphonamide, N-[4-(4-amino-3N,N-diethylsulphamoylphenylamino)-3-nitro-benzenesulphonyl]- p-toluenesulphonamide, N-[4-(4-amino-3-N-butylsulphamoylphenylamino)-3-nitro-benzenesulphonyl]-methanesulphonamide, N-[4-(4-amino-3-N,N-dihydroxyethylsulphamoyl-phenylamino)-3-nitro-benzenesulphonyl]-benzenesulphonamide, N-[4-(4-amino-3-N-3'-sulpholanylsulphamoyl-phenylamino)-3-nitro-benzenesulphonyl]-benzenesulphonamide, N-[4-(4-amino-3-N,N-pentamethylenesulphamoyl-phenylamino)-3-nitro-benzenesulphonyl]-benzenesulphonamide, N-[4-(4-amino-3-N-cyclohexylsulphamoyl-phenylamino)-3-nitro-benzenesulphonyl]-benzenesulphonamide, N-[4(4-amino-3-N-phenylsulphamoyl-phenylamino)-3-nitro-benzenesulphonyl]-benzenesulphonamide, N-[2-amino-5-(2,4-dinitrophenylamino)-benzenesulphonyl]-benzenesulphonamide, -p-toluenesulphonamide, -methanesulphonamide, -2'-naphthylsulphonamide and -butanesulphonamide, N-[2-amino-5-(2-nitro4-sulphamoyl-phenylamino)-benzenesulphonyl]-benzenesulphonamide, -o-toluenesulphonamide, -butanesulphonamide and -1'-naphthylsulphonamide, N-[2-amino-5-(2-nitro-N,N-dimethylsulphamoylphenylamino)-benzenesulphonyl]-benzenesulphonamide, N-[2-amino-5-(2-nitro-4-N-propylsulphamoyl-phenylamino)-benzenesulphonyl]-p-toluenesulphonamide, N-[2-amino-5-(2-nitro-4-N-hydroxyethylsulphamoyl-phenylamino)-benzenesulphonyl]-methanesulphonamide, N-[2-amino-5-(2-nitro-4-N-cyclopentylsulphamoylphenylamino)-benzenesulphonyl]-butanesulphonamide, N-[2-amino-5-(2-nitro-4-N-phenylsulphamoyl-phenylamino)-benzenesulphonyl]-2'-naphthylsulphonamide and N-[2-amino-5-(2-nitro-4-N,N-hexamethylenesulphamoyl-phenylamino)-benzenesulphonyl]-p-chlorobenzenesulphonamide.

The following may be mentioned as examples of suitable phenolic coupling components VIII: phenol, o-cresol, m-cresol, p-cresol, 1-hydroxy-4-ethyl-benzene, 1-hydroxy-4-tertiary butyl-benzene, 1-hydroxy-2- ethyl-benzene, 1-hydroxy2-isopropyl-benzene, 1-hydroxy-2-sec.-butyl-benzene, 3-hydroxy1,2-dimethylbenzene, p-chlorophenol, 2-hydroxy-1,4-dimethylbenzene, 4-hydroxy-1,2-dimethyl-benzene, 2-hydroxy-1,3-diethyl-benzene, 1-hydroxy-2-methoxy-benzene, 1-hydroxy-3-methoxy-benzene, 1-hydroxy-3-ethoxy-benzene, 1-hydroxy-4-butoxy-benzene, 1-hydroxy-3-butoxy-benzene, 2-hydroxy-diphenyl, o-chlorophenol and 6-chloro-3-methylphenol.

The following may be mentioned as examples of suitable alkylating agents for introducing alkyl radicals $R_4$: dimethyl sulphate, diethyl sulphate, methyl chloride, methyl iodide, ethyl chloride, ethyl bromide, propyl chloride, isopropyl chloride, butyl chloride, benzyl chloride, epichlorohydrin, p-toluenesulphonic acid methyl ester, benzenesulphonic acid ethyl ester and p-toluenesulphonic acid benzyl ester.

Alkylene oxides which can be used for alkylation are, for example, ethylene oxide, 1,2-propylene oxide, 1,2- and 2,3-butylene oxide, styrene oxide, glycidol, glycidyl methyl ether, glycidyl acetate, glycidyl propionate, glycidyl methacrylate, glycidyl benzyl ether and isobutylene oxide.

The following may be mentioned as examples of suitable acylating agents for introducing —$SO_2$-aryl radicals: benzenesulphonic acid chloride, o-, m- and p-chlorobenzenesulphonic acid chloride, 3,4-dichlorobenzenesulphonic acid chloride, 2,5-dichlorobenzenesulphonic acid chloride, o-, m- and p-toluenesulphonic acid chloride, o-, m- and p-nitrobenzenesulphonic acid chloride, 4-chloro-3-nitrobenzenesulphonic acid chloride, 2-chloro-5-nitrobenzenesulphonic acid chloride, 4-chloro-2-toluenesulphonic acid chloride, 2-chloro-4-toluenesulphonic acid chloride, 1,3-dimethyl-4-benzenesulphonic acid chloride, 1,2,3,4-tetrahydronaphthalene-6-sulphonic acid chloride, 1- and 2-naphthalenesulphonic acid chloride, o-, m-and p-methoxybenzenesulphonic acid chloride, o-, m- and p-ethoxybenzenesulphonic acid chloride and the corresponding arylsulphonic acid bromides.

The condensation of the o-nitrohalogenobenzenes (X) with the aminoazo dyestuffs (XI) to give the dyestuffs of the formula (I), or of the o-nitrohalogenobenzenes (XIII) with the acyldiamines (XIV) to give the acyl derivatives of the diazo components (XII), or with the diamines (XIVa) to give (XII), or of the o-nitrohalogenobenzenes (XV) with the acyldiamines (XIV) to give the compounds (XVI), are carried out in a manner which is in itself known, for example in an aqueous medium with addition of organic solvents, such as alcohols or glycols, and in the presence of acid-binding agents such as magnesium oxide, calcium carbonate, alkali metal carbonates or alkali metal bicarbonates. The condensations can also be carried out under anhydrous conditions, for example in glycol or in glycol monomethyl ether in the presence of sodium acetate. Temperatures of between 50° and 200° C, preferably between 80 and 150° C, are used for the condensations.

The diazotisation of the diazo components (VII) is carried out in a manner which is in itself known, for example in acid aqueous solution or suspensions using sodium nitrite solution; the diazotisation temperatures can be between 0 and 20° C, but preferably between 10° and 15° C. The diazotisation of the amines (VII) can furthermore also be carried out indirectly by dissolving the amines in an alkaline medium, adding sodium nitrite solution and pouring the mixture into aqueous hydrochloric acid, or adding hydrochloric acid to the mixture.

The coupling of the diazotised amines (VII) with the phenols of the formula (VIII) to give the azo dyestuffs (IX) is also carried out in the usual manner, preferably in an aqueous alkaline medium. The azo dyestuffs of the formula (IX) can be isolated by simply filtering them off, if necessary after addition of sodium chloride. If the dyestuffs are obtained in an impure form, they can be recrystallised in a known manner from hot water, if appropriate with addition of alkali.

The reaction of the azo dyestuffs (IX) with the alkylating agents to give the dyestuffs (I), in which
$R_4$ is alkyl,
is carried out in a manner which is in itself known, for example in an aqueous alkaline medium or in an alkaline aqueousorganic medium.

The reaction is most advantageously carried out at temperatures of 70°–90° C, if necessary, in the case of low-boiling alkylating agents (for example propylene oxide, methyl chloride or ethyl chloride) in an autoclave.

The reaction of the azo dyestuffs (IX) with the arylsulphonic acid halides to give the dyestuffs (I), in which
$R_4$ is —$SO_2$—aryl,
is also carried out in the usual manner, for example in an aqueous alkaline medium.

The more sparingly soluble dyestuffs (I) can be rendered readily water-soluble by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated, or exist, or be employed further, in the form of the free acid or as alkali metal salts or ammonium salts. Suitable alkali metal salts in which the hydrogen atom of the —NH—group is thus replaced by an alkali metal cation are, for example, the sodium, potassium or lithium salts.

The new dyestuffs are particularly suitable for dyeing and printing natural and synthetic fibrous materials containing amide groups, for example materials consisting of wool, silk and polyamide, such as poly-ε-caprolactam or the reaction product of hexamethylenediamine with adipic acid. The dyeings obtained, especially those on polyamide materials, are distinguished by good fastness properties, especially by good wet fastness properties and good light fastness properties. The neutral affinity, and the behaviour in combination with other suitable dyestuffs for this material, are also good. The dyestuffs of the formula (I) are employed for dyeing either in the form of the free acid ( >NH) or as the alkali metal salt or ammonium salt.

In the examples which follow "parts" are to be understood as parts by weight, and all temperatures are in ° C.

EXAMPLE 1

236.6 parts of 3-nitro-4-chlorobenzenesulphonamide are suspended in 500 parts of water. 370 Parts of benzenesulphonic acid chloride are added at 40° over the course of one hour. At the same time, a pH value of 10–11 is maintained by dropwise addition of concentrated sodium hydroxide solution. The mixture is stirred for a further 2 hours at 40°, during which time the pH value continues to be maintained at 10–11. After cooling the reaction mixture, the precipitate, which in the form of the free acid corresponds to the formula

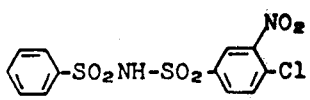 (XIX)

is filtered off, washed with water and dried at 60°. 365 Parts of an almost colourless compound are obtained.

EXAMPLE 2

188 parts of 3-nitro-4-chlorobenzenesulphonylbenzenesulonamide (XIX) are stirred with 75 parts of acetparamine, 82 parts of anhydrous sodium acetate and 3 parts of piperidine in 500 parts of glycol monomethyl ether at 125° for 40 hours. After cooling, the solution is poured onto 1,500 parts of ice water and the precipitate thus obtained is filtered off, washed and dried at 60°. 190 Parts of a yellow powder, which in the form of the free acid corresponds to the formula

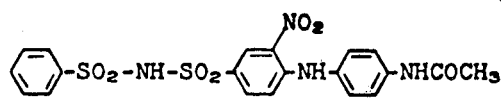 (XX)

are obtained.

EXAMPLE 3

118 parts of 3-nitro-4-chlorobenzenesulphonamide together with 75 parts of acetparamine, 82 parts of anhydrous sodium acetate and 3 parts of piperidine are stirred in 500 parts of ethylene glycol at 125° for 8 hours. After cooling, the solution is poured onto 1,500 parts of ice water and the precipitate of the compound (XXI), thus obtained, is filtered off, washed and dried at 60°. 140 Parts of a yellow powder are obtained.

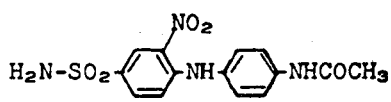 (XXI)

EXAMPLE 4

175 parts of the compound (XXI) are suspended in 700 parts of water. 264 Parts of benzenesulphonic acid chloride are added over the course of one hour at 40°. At the same time a pH value of 10–11 is maintained by dropwise addition of concentrated sodium hydroxide solution. The mixture is stirred for a further 3 hours at 40°, whilst continuing to maintain a pH value of 10–11. After the reaction mixture has cooled, the precipitate, which in the form of the free acid corresponds to the formula (XXII), is filtered off, washed and dried at 60°. 209 Parts of a yellow powder are obtained.

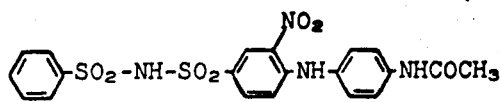 (XXII)

EXAMPLE 5

245 parts of the compound (XXII) are suspended in 2,000 parts of water at 80° and 240 parts of concentrated sodium hydroxide solution are added.

The mixture is stirred for 6 hours at 80°. After cooling, the precipitate of the amine (XXIII) is filtered off, washed with a little water and dried at 60°. 160 Parts of a yellow powder are obtained.

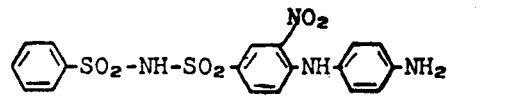 (XXIII)

EXAMPLE 6

224 parts of the compound (XXIII) are dissolved in 1,500 parts of water at 40° and pH 9, 34.5 parts of sodium nitrite are added and the mixture, at 40°, is added dropwise to 120 parts of concentrated hydrochloric acid and ice at a rate such that the temperature is constantly maintained at 10°–15° C. The mixture is stirred for a further 4–6 hours at 10°–15° C, the excess nitrite is destroyed with amidosulphonic acid, 47 parts of phenol are added and the pH is adjusted to 10 sodium hydroxide solution at 0°–5° C and is maintained at this value by further addition of sodium hydroxide solution until the coupling is complete. The dyestuff, which in the form of the free acid corresponds to the formula

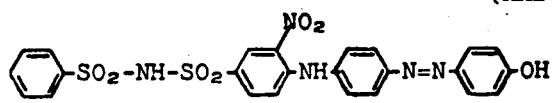 (XXIV)

is filtered off, washed with a little water and dried at 50°. 242 parts of a yellow powder which dyes synthetic polyamides in yellow shades are obtained. The dyeings have a good level of fastness.

EXAMPLE 7

55 parts of the dyestuff (XXIV) are dissolved in 500 parts of water at pH 10.5, obtained by adding concentrated sodium hydroxide solution, and 50 ml of dimethyl sulphate are added dropwise at 45°. The pH value is kept at 10 to 10.5 by simultaneous dropwise addition of concentrated sodium hydroxide solution.

The mixture is stirred for a further 30 minutes and the dyestuff which has precipitated is filtered off, washed with sodium chloride and dried in vacuo at 50°

C. The dyestuff corresponds, in the form of the free acid, to the formula

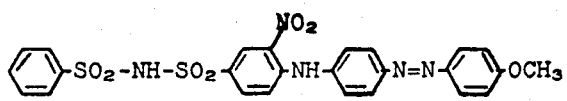

(XXV)

and dyes synthetic polyamides in yellow shades having good fastness properties.

EXAMPLE 8

55 parts of the dyestuff (XXIV) are dissolved in 500 parts of water at pH 10, obtained by addition of concentrated sodium hydroxide solution, and 18.6 parts of benzenesulphochloride are added dropwise at 80°. The pH value is maintained at 10 to 10.5 by simultaneous dropwise addition of concentrated sodium hydroxide solution. The mixture is stirred for a further 30 minutes and the dyestuff which has precipitated is filtered off, washed with sodium chloride solution and dried in vacuo at 50°. The dyestuff corresponds, in the form of the free acid, to the formula

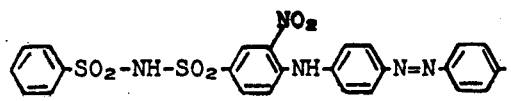

(XXVI)

and dyes synthetic polyamides in yellow shades having good fastness properties.

EXAMPLE 9

55 parts of the dyestuff (XXIV) are dissolved in 500 parts of water at pH 8.5, obtained by addition of concentrated sodium hydroxide solution. 18 parts of 1,2-butylene oxide are added dropwise at 70° C. The mixture is stirred for 10 hours at 70° C and is allowed to cool, and the dyestuff which has precipitated is filtered off, washed with sodium chloride solution and dried in vacuo at 50°. The dyestuff corresponds, in the form of the free acid, to the formula

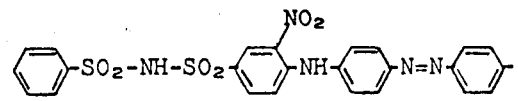

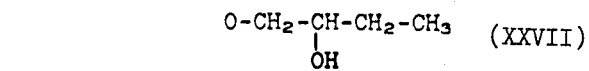

(XXVII)

and dyes synthetic polyamides in yellow shades having good fastness properties.

DYEING EXAMPLE 0.1 g of the dyestuff of Example 7 is dissolved in 100 ml of hot water, 5 ml of 10% strength ammonium acetate solution are added and the mixture is diluted to a volume of 500 ml with water. 10 g of polyamide fibres are introduced into the dye bath, which is brought to the boil over the course of 20 minutes, 4 ml of 10% strength acetic acid are added and the bath is kept at the boil for one hour. The fibres are then rinsed and dried at 70°–80° C.

Similar dyestuffs, which have similar properties to the dyestuffs obtained according to Examples 6, 7, 8 and 9, are obtained by reacting the diazo components shown below with the coupling components shown below and, where relevant, alkylating or acylating the phenolic hydroxyl group. The dyestuffs dye synthetic polyamides in yellow to orange shades having good fastness properties.

| Ex. No. | Diazo component | Coupling component | Alkylating agent or acylating agent |
|---|---|---|---|
| 10 | CH₃—SO₂—NH—SO₂—(ring with NO₂)—NH—(ring)—NH₂ | (ring)—OH | — |
| 11 | '' | H₃C—(ring)—OH | (CH₃O)₂SO₂ |
| 12 | '' | (ring)—(ring)—OH | C₂H₅Cl |
| 13 | '' | (ring with CH₃)—OH | (ring)—CH₂—Cl |
| 14 | '' | (ring with CH₃)—OH | (ring)—SO₂—Cl |

-continued

| Ex. No. | Diazo component | Coupling component | Alkylating agent or acylating agent |
|---|---|---|---|
| 15 | $CH_3-SO_2-NH-SO_2-$ ⟨2-$NO_2$, 4-⟩ $-NH-$ ⟨⟩ $-NH_2$ | ⟨⟩-OH | $CH_2-CH-CH_2-CH_3$ \ O / |
| 16 | $C_4H_9-SO_2-NH-SO_2-$ ⟨2-$NO_2$, 4-⟩ $-NH-$ ⟨⟩ $-NH_2$ | ⟨⟩-OH | ⟨⟩-$CH-CH_2$ \ O / |
| 17 | '' | $CH_3-$⟨⟩-OH | $CH_2-CH-CH_2OH$ \ O / |
| 18 | '' | $(CH_3)_3C-$⟨⟩-OH | — |
| 19 | '' | ⟨3-$CH_3$⟩-OH | $CH_2-C(CH_3)_2$ \ O / |
| 20 | $C_4H_9-SO_2-NH-SO_2-$ ⟨2-$NO_2$, 4-⟩ $-NH-$ ⟨⟩ $-NH_2$ | $H_5C_2-$⟨⟩-OH | $H_3C-$⟨⟩-$SO_3CH_3$ |
| 21 | $CH_3-$⟨⟩-$SO_2-NH-SO_2-$ ⟨2-$NO_2$, 4-⟩ $-NH-$ ⟨⟩ $-NH_2$ | ⟨2-Cl⟩-OH | $(C_2H_5O)_2SO_2$ |
| 22 | '' | ⟨2-$CH_3$⟩-OH | $CH_3I$ |
| 23 | '' | Cl-⟨⟩-OH | $CH_2-CH-CH_2OCH_3$ \ O / |
| 24 | '' | ⟨2-$CH(CH_3)_2$⟩-OH | $CH_2-CH-CH_2Cl$ \ O / |
| 25 | ⟨2-$CH_3$⟩-$SO_2-NH-SO_2-$ ⟨2-$NO_2$, 4-⟩ $-NH-$ ⟨⟩ $-NH_2$ | ⟨⟩-OH | $H_3C-$⟨⟩-$SO_3CH_2-$⟨⟩ |
| 26 | '' | $H_3C-$⟨⟩-OH | Cl-⟨⟩-$SO_2Cl$ |
| 27 | '' | ⟨3,5-$(H_3C)_2$⟩-OH | $C_3H_7Cl$ |
| 28 | '' | ⟨2-$OCH_3$⟩-OH | ⟨2-$CH_3$⟩-$SO_2Cl$ |
| 29 | '' | ⟨2,6-$(C_2H_5)_2$⟩-OH | — |

-continued

| Ex. No. | Diazo component | Coupling component | Alkylating agent or acylating agent |
|---|---|---|---|
| 30 | naphthalene-1-SO$_2$—NH—SO$_2$—(2-NO$_2$,4-)C$_6$H$_3$—NH—C$_6$H$_4$—NH$_2$ | C$_6$H$_5$—OH | C$_2$H$_5$Br |
| 31 | '' | 3-CH$_3$-C$_6$H$_4$—OH | C$_6$H$_5$—SO$_3$C$_2$H$_5$ |
| 32 | '' | 2,3-(CH$_3$)$_2$-C$_6$H$_3$—OH | (CH$_3$)$_2$CH—Cl |
| 33 | '' | 3-H$_5$C$_2$O-C$_6$H$_3$—OH | CH$_2$—CH—CH$_2$OCH$_2$—C$_6$H$_5$ (epoxide) |
| 34 | naphthalene-2-SO$_2$—NH—SO$_2$—(3-NO$_2$,4-)C$_6$H$_3$—NH—C$_6$H$_4$—NH$_2$ | 4-CH$_3$-C$_6$H$_4$—OH | — |
| 35 | naphthalene-2-SO$_2$—NH—SO$_2$—(3-NO$_2$,4-)C$_6$H$_3$—NH—C$_6$H$_4$—NH$_2$ | C$_6$H$_5$—OH | CH$_3$—CH—CH—CH$_3$ (epoxide) |
| 36 | '' | 4-Cl-C$_6$H$_4$—OH | (CH$_3$O)$_2$SO$_2$ |
| 37 | '' | 4-(CH$_3$)$_3$C-C$_6$H$_4$—OH | 4-H$_3$C-C$_6$H$_4$—SO$_3$C$_2$H$_5$ |
| 38 | 4-Cl-C$_6$H$_4$—SO$_2$—NH—SO$_2$—(3-NO$_2$,4-)C$_6$H$_3$—NH—C$_6$H$_4$—NH$_2$ | 4-H$_3$C-C$_6$H$_4$—OH | — |
| 39 | '' | biphenyl-OH | C$_2$H$_5$Br |
| 40 | C$_6$H$_5$—SO$_2$—NH—SO$_2$—(2,6-(NO$_2$)$_2$,4-)C$_6$H$_2$—NH—C$_6$H$_4$—NH$_2$ | 3-CH$_3$-C$_6$H$_4$—OH | CH$_2$—CH—CH$_2$OCO—CH$_3$ (epoxide) |
| 41 | 2-Cl-C$_6$H$_4$—SO$_2$—NH—SO$_2$—(2,6-(NO$_2$)$_2$,4-)C$_6$H$_2$—NH—C$_6$H$_4$—NH$_2$ | 3-Cl,5-H$_3$C-C$_6$H$_3$—OH | C$_4$H$_9$Cl |
| 42 | 4-H$_3$C-C$_6$H$_4$—SO$_2$—NH—SO$_2$—(2,6-(NO$_2$)$_2$,4-)C$_6$H$_2$—NH—C$_6$H$_4$—NH$_2$ | C$_6$H$_5$—OH | 4-H$_3$C-C$_6$H$_4$—SO$_3$CH$_2$—C$_6$H$_5$ |
| 43 | (CH$_3$)$_2$N—SO$_2$—NH—SO$_2$—(2,6-(NO$_2$)$_2$,4-)C$_6$H$_2$—NH—C$_6$H$_4$—NH$_2$ | 4-H$_3$C-C$_6$H$_4$—OH | CH$_2$—CH—CH$_2$—OCO—C(CH$_3$)=CH$_2$ (epoxide) |

| Ex. No. | Diazo component | Coupling component | Alkylating agent or acylating agent |
|---|---|---|---|
| 44 | naphthyl-SO$_2$-NH-SO$_2$-(3-NO$_2$,4-)-C$_6$H$_3$-NH-(3-OCH$_3$,4-NH$_2$)-C$_6$H$_3$ | C$_6$H$_5$-OH | CH$_2$-CH-CH$_2$-CH$_3$ (epoxide) |
| 45 | naphthyl-SO$_2$-NH-SO$_2$-(3-NO$_2$,4-)-C$_6$H$_3$-NH-(3-OCH$_3$,4-NH$_2$)-C$_6$H$_3$ | (CH$_3$)$_3$C-C$_6$H$_4$-OH | — |
| 46 | CH$_3$-SO$_2$-NH-SO$_2$-(3-NO$_2$,4-)-C$_6$H$_3$-NH-(3-OCH$_3$,4-NH$_2$)-C$_6$H$_3$ | 3-CH$_3$-C$_6$H$_4$-OH | (CH$_3$O)$_2$SO$_2$ |
| 47 | C$_3$H$_7$-SO$_2$-NH-SO$_2$-(3-NO$_2$,4-)-C$_6$H$_3$-NH-(3-OCH$_3$,4-NH$_2$)-C$_6$H$_3$ | Cl-C$_6$H$_4$-OH | CH$_2$-CH-CH$_3$ (epoxide) |
| 48 | Cl-C$_6$H$_4$-SO$_2$-NH-SO$_2$-(3-NO$_2$,4-)-C$_6$H$_3$-NH-(3-OCH$_3$,4-NH$_2$)-C$_6$H$_3$ | (CH$_3$)$_2$CH-C$_6$H$_4$-OH | C$_3$H$_7$Br |
| 49 | C$_2$H$_5$-SO$_2$-NH-SO$_2$-(3-NO$_2$,4-)-C$_6$H$_3$-NH-(3-OC$_2$H$_5$,4-NH$_2$)-C$_6$H$_3$ | 3,4-(H$_3$C)$_2$-C$_6$H$_3$-OH | — |
| 50 | 3-CH$_3$-C$_6$H$_4$-SO$_2$NHSO$_2$-(3-NO$_2$,4-)-C$_6$H$_3$-NH-(2,5-Cl$_2$,4-NH$_2$)-C$_6$H$_2$ | C$_6$H$_5$-OH | CH$_2$-CH-CH$_2$Cl (epoxide) |
| 51 | 2-naphthyl-SO$_2$-NH-SO$_2$-(3-NO$_2$,4-)-C$_6$H$_3$-NH-(2,5-Cl$_2$,4-NH$_2$)-C$_6$H$_2$ | H$_3$C-C$_6$H$_4$-OH | (C$_2$H$_5$O)$_2$SO$_2$ |
| 52 | C$_3$H$_7$-SO$_2$-NH-SO$_2$-(3-NO$_2$,4-)-C$_6$H$_3$-NH-(2,5-Cl$_2$,4-NH$_2$)-C$_6$H$_2$ | 2-CH(CH$_3$)$_2$-C$_6$H$_4$-OH | C$_6$H$_5$-CH-CH$_2$ (epoxide) |
| 53 | C$_4$H$_9$-SO$_2$-NH-SO$_2$-(3-NO$_2$,4-)-C$_6$H$_3$-NH-(3-OCH$_3$,4-NH$_2$)-C$_6$H$_3$ | CH$_3$-C$_6$H$_4$-OH | C$_4$H$_9$Cl |
| 54 | CH$_3$-C$_6$H$_4$-SO$_2$-NH-SO$_2$-(3-NO$_2$,4-)-C$_6$H$_3$-NH-(3-OCH$_3$,4-NH$_2$)-C$_6$H$_3$ | C$_6$H$_5$-OH | CH$_2$-CH-CH$_2$OH (epoxide) |
| 55 | C$_6$H$_5$-SO$_2$-NH-SO$_2$-(3-NO$_2$,4-)-C$_6$H$_3$-NH-(3-CH$_3$,4-NH$_2$)-C$_6$H$_3$ | 2-OH,3-CH$_3$-C$_6$H$_4$ | — |
| 56 | CH$_3$SO$_2$NHSO$_2$-(3-NO$_2$,4-)-C$_6$H$_3$-NH-(3-C$_2$H$_5$,4-NH$_2$)-C$_6$H$_3$ | biphenyl-OH | (CH$_3$O)$_2$SO$_2$ |
| 57 | CH$_3$-C$_6$H$_4$-SO$_2$NHSO$_2$-(3-NO$_2$,4-)-C$_6$H$_3$-NH-(3-SO$_2$NH$_2$,4-NH$_2$)-C$_6$H$_3$ | CH$_3$-C$_6$H$_4$-OH | CH$_2$-CH-CH$_2$-CH$_3$ (epoxide) |

-continued

| Ex. No. | Diazo component | Coupling component | Alkylating agent or acylating agent |
|---|---|---|---|
| 58 | C₂H₅SO₂NHSO₂—⟨C₆H₃(NO₂)⟩—NH—⟨C₆H₃(SO₂N(C₂H₅)₂)⟩—NH₂ | (CH₃)₃C—⟨C₆H₄⟩—OH | C₃H₇Cl |
| 59 | ⟨naphthyl⟩—SO₂—NH—SO₂—⟨C₆H₃(NO₂)⟩—NH—⟨C₆H₃(SO₂NHC₄H₉)⟩—NH₂ | ⟨C₆H₅⟩—OH | CH₃I |
| 60 | ⟨C₆H₄(Cl)⟩—SO₂NHSO₂—⟨C₆H₃(NO₂)⟩—NH—⟨C₆H₃(SO₂N(C₂H₄OH)₂)⟩—NH₂ | ⟨C₆H₄(CH₃)⟩—OH | — |
| 61 | ⟨C₆H₅⟩—SO₂NHSO₂—⟨C₆H₃(NO₂)⟩—NH—⟨C₆H₃(SO₂NH—sulfolanyl)⟩—NH₂ | H₃C—⟨C₆H₄⟩—OH | CH₂—CH—CH₂Cl (epoxide) |
| 62 | CH₃SO₂NHSO₂—⟨C₆H₃(NO₂)⟩—NH—⟨C₆H₃(SO₂—N-piperidyl)⟩—NH₂ | ⟨C₆H₄(Cl)⟩—OH | CH₂—CH—CH₂OCH₃ (epoxide) |
| 63 | ⟨C₆H₄(CH₃)⟩—SO₂NHSO₂—⟨C₆H₃(NO₂)⟩—NH—⟨C₆H₃(SO₂—NH—C₆H₅)⟩—NH₂ | 2,5-(CH₃)₂-C₆H₃—OH | (C₂H₅O)₂SO₂ |
| 64 | O₂N—⟨C₆H₃(NO₂)⟩—NH—⟨C₆H₃(SO₂—NH—SO₂—C₆H₅)⟩—NH₂ | H₃C—⟨C₆H₄⟩—OH | — |
| 65 | O₂N—⟨C₆H₃(NO₂)⟩—NH—⟨C₆H₃(SO₂NHSO₂N(C₄H₉)₂)⟩—NH₂ | ⟨C₆H₅⟩—OH | CH₂—C(CH₃)₂ (epoxide) |
| 66 | O₂N—⟨C₆H₃(NO₂)⟩—NH—⟨C₆H₃(SO₂NHSO₂—naphthyl)⟩—NH₂ | H₅C₂—⟨C₆H₄⟩—OH | CH₃Cl |
| 67 | H₂NSO₂—⟨C₆H₃(NO₂)⟩—NH—⟨C₆H₃(SO₂NH—SO₂—C₆H₄CH₃)⟩—NH₂ | ⟨C₆H₅⟩—OH | — |
| 68 | H₂NSO₂—⟨C₆H₃(NO₂)⟩—NH—⟨C₆H₃(SO₂NHSO₂CH₃)⟩—NH₂ | 3-CH₃-C₆H₄—OH | H₃C—⟨C₆H₄⟩—SO₃CH₃ |
| 69 | (CH₃)₂NSO₂—⟨C₆H₃(NO₂)⟩—NH—⟨C₆H₃(SO₂NHSO₂—C₆H₅)⟩—NH₂ | Cl—⟨C₆H₄⟩—OH | (CH₃O)₂SO₂ |

-continued

| Ex. No. | Diazo component | Coupling component | Alkylating agent or acylating agent |
|---|---|---|---|
| 70 | $C_3H_7HNSO_2$—⬡(NO_2)—NH—⬡(SO_2NHSO_2C_4H_9)—NH_2 | ⬡—OH | $CH_2$—CH—$CH_2Cl$ \ O / |
| 71 | HO—$H_4C_2HNSO_2$—⬡(NO_2)—NH—⬡(SO_2NHSO_2-naphthyl)—NH_2 | $CH_3$—⬡—OH | $C_2H_5Cl$ |
| 72 | cyclopentyl—HNSO_2—⬡(NO_2)—NH—⬡(SO_2NHSO_2—⬡—$CH_3$)—NH_2 | ⬡(Cl)—OH | $CH_2$—CH—$CH_2OCOCH_3$ \ O / |
| 73 | ⬡—NHSO_2—⬡(NO_2)—NH—⬡(SO_2NHSO_2CH_3)—NH_2 | ⬡—OH | $H_3C$—⬡—$SO_3C_2H_5$ |
| 74 | pyrrolidinyl—N—SO_2—⬡(NO_2)—NH—⬡(SO_2NHSO_2—⬡—Cl)—NH_2 | $H_3C$,$CH_3$—⬡—OH | $CH_2$—CH—$CH_2$—$CH_3$ \ O / |
| 75 | ⬡—$SO_2NHSO_2$—⬡(NO_2)—NH—⬡—NH_2 | ⬡(CH_3)—OH | $CH_2$—CH—$CH_2$—$CH_3$ \ O / |
| 76 | ⬡(CH_3)—$SO_2NHSO_2$—⬡(NO_2)—NH—⬡—NH_2 | ⬡(CH_3)—OH | $CH_2$—CH—$CH_2$—$CH_3$ \ O / |

We claim:
1. Azo dyestuff which in the form of the free acid corresponds to the formula

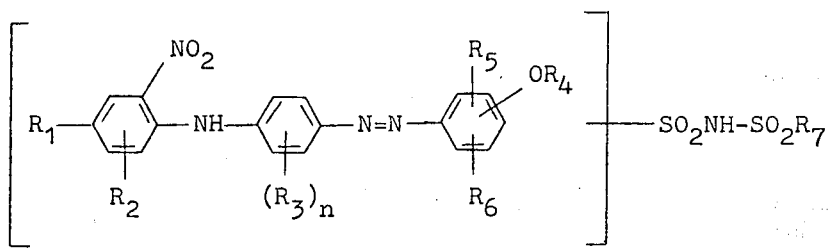

wherein
$R_1$ is H; $NO_2$; CN;

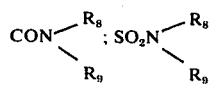

or $COOR_{10}$;

$R_2$ is H; $C_1$–$C_4$-alkyl; $C_1$–$C_4$-alkyl substituted by OH, CN, Cl, Br, F or $C_1$–$C_4$-alkoxy; $C_1$–$C_4$-alkoxy; phenyl; phenyl substituted by Cl, Br, F, $C_1$–$C_4$-alkyl or $C_1$–$C_4$-alkoxy; Cl; Br; F; or $NO_2$;

$R_3$ is H; Cl; Br; F; $C_1$–$C_4$-alkyl; $C_1$–$C_4$-alkyl substituted by OH, CN, Cl, Br, F or $C_1$–$C_4$-alkoxy; $C_1$–$C_4$-alkoxy; phenyl; phenyl substituted by Cl, Br, F, $C_1$–$C_4$-alkyl or $C_1$–$C_4$-alkoxy; or

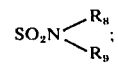

$R_4$ is H; $C_1$–$C_5$-alkyl; $C_1$–$C_5$-alkyl substituted by OH, phenyl, $C_1$–$C_4$-alkoxy, $C_2$–$C_4$-alkenylcarbonyloxy or $C_1$–$C_4$-alkenylcarbonyloxy; $SO_2$-phenyl; $SO_2$-naphthyl; or $SO_2$-phenyl and $SO_2$-naphthyl substituted by $C_1$–$C_4$-alkyl, $C_1$–$C_4$-alkoxy, Cl, Br, F, CN or $NO_2$;

$R_5$ is H; Cl; Br; F; $C_1$–$C_4$-alkyl; $C_1$–$C_4$-alkyl substituted by OH, CN, Cl, Br, F or $C_1$–$C_4$-alkoxy; $C_1$–$C_4$-alkoxy; phenyl; or phenyl substituted by Cl, Br, F, $C_1$–$C_4$-alkyl or $C_1$–$C_4$-alkoxy;

$R_6$ is H; $C_1$–$C_4$-alkyl; $C_1$–$C_4$-alkyl substituted by OH, CN, Cl, Br, F or $C_1$–$C_4$-alkoxy;

$R_7$ is $C_1$–$C_4$-alkyl; phenyl; naphthyl; phenyl or naphthyl substituted by $C_1$–$C_4$-alkyl, $C_1$–$C_4$-alkoxy, Cl, Br, F, CN or $NO_2$; diethylamino; dimethylamino; or dibutylamino;

$R_8$ and $R_9$ are H; alkyl; alkyl substituted by OH, CN, Cl, Br, F or $C_1$–$C_4$-alkoxy; phenyl; phenyl substituted by $C_1$–$C_4$-alkyl, $C_1$–$C_4$-alkoxy, Cl, Br, F, CN or $NO_2$; benzyl; or phenethyl;

$R_{10}$ is $C_1$–$C_4$-alkyl or $C_1$–$C_4$-alkyl substituted by OH, CN, Cl, Br, F or $C_1$–$C_4$-alkoxy;

$n$ is 1 or 2; and the $OR_4$ radical is in the ortho- or para-position relative to the azo group and the $SO_2$-NH-$SO_2$-$R_7$ radical is present in place or $R_1$ or $R_3$.

2. Azo dyestuff of Claim 1 which in the form of the free acid corresponds to the formula

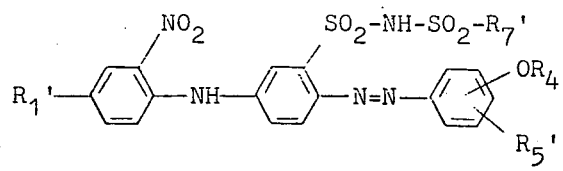

wherein $R_1'$ is H, $NO_2$ or

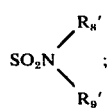

$R_4'$ is H, methyl, ethyl, propyl, butyl, 2-hydroxyethyl, 2-hydroxypropyl, 2-hydroxybutyl, 1-methyl-2-hydroxypropyl, 2-hydroxy-2-phenylethyl or 2,3-dihydroxypropyl;

$R_5'$ is H, $C_1$–$C_4$-alkyl or phenyl:

$R_7'$ has the meaning indicated in claim 1; and $R_8'$ and $R_9'$ are H, $C_1$–$C_4$-alkyl, phenyl or benzyl.

3. Azo dyestuff of claim 1 which in form of the free acid corresponds to the formula

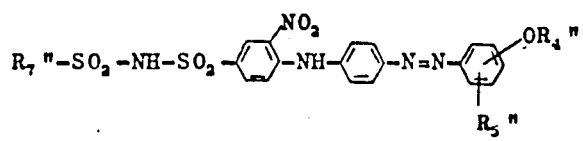

wherein $R_3'$ is H, Cl, Br, F, $C_1$–$C_4$-alkyl, $C_1$–$C_4$-alkoxy or

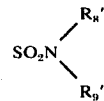

$n$ is 1 or 2; and $R_4'$, $R_5'$, $R_7'$ $R_8'$ and $R_9'$ have the meaning indicated in claim 2.

4. Azo dyestuffs according to claim 1, which in the form of the free acid correspond to the formula $$R_7''-SO_2-NH-SO_2-\underset{}{\bigcirc}-NH-\underset{}{\bigcirc}-N=N-\underset{R_5''}{\bigcirc}-OR_4''$$

wherein $R_4''$ represents H, methyl, ethyl, propyl, 2-hydroxyethyl, 2-hydroxypropyl or 2-hydroxybutyl, $R_5''$ represents H, methyl, ethyl, tert.-butyl or phenyl and $R_7''$ represents methyl, ethyl, propyl, butyl, phenyl or o- or p-tolyl and the —$OR_4''$ radical is in the o-position or p-position relative to the azo bridge.

* * * * *